United States Patent Office 2,864,724
Patented Dec. 16, 1958

2,864,724

COATED FILM AND METHOD OF MAKING SAME

Gerald I. Keim, Oxford, Pa., assignor to Hercules Powder Company, Wilmington, Del., a corporation of Delaware No Drawing. Application September 21, 1956
Serial No. 611,354

6 Claims. (Cl. 117—76)

This invention relates to the treatment of nonfibrous regenerated cellulose film to improve its resistance to moisture vapor transmission.

Nonfibrous regenerated cellulose films have found utility in the packaging of various products to protect them against the deleterious effects of atmospheric moisture. To adapt them for this use, such films are conventionally provided with a water-repellent top coat adhesively secured thereto by a suitable anchoring agent. One of the frequent disadvantages encountered in the use of these treated films for the indicated purpose is that the anchoring agent breaks down after a period of exposure to moist atmospheric conditions, particularly at higher relative humidities. As a result, the adhesive bond between the nonfibrous regenerated film and the water-repellent top coat is weakened or broken, thereby permitting the entry of moisture into the package with consequent adverse effects on the packaged product.

A principal object of the present invention is the provision of a process for anchoring nonfibrous regenerated cellulose film to the water-repellent top coat whereby a film having prolonged resistance to moisture and moisture vapor transmission is obtained.

A further and more specific object of the invention is the provision of a film of the indicated type wherein the nonfibrous regenerated cellulose film is anchored to the water-repellent top coat by a novel and highly effective anchoring agent.

In accordance with the invention, these and other objects are attained by first treating nonfibrous regenerated cellulose film with a hydrophilic cationic tetrahydro triazone modified urea-formaldehyde resin and then coating the same with a moisture-resistant top coat.

Having described the invention generally, the following examples will serve to illustrate specific embodiments thereof.

Example 1

A tetrahydro-5-hydroxyethyl-s-triazin-2(1H)-one modified urea-formaldehyde resin was prepared using the following formulation:

| | Parts |
|---|---|
| Urea | 240 |
| 37% formaldehyde | 672 |
| Guanidine hydrochloride | 27 |
| Tetrahydro-1,3- dimethylol-5- hydroxyethyl-s- triazin-2(1H)-one solution (40% solids) | 480 |

The above ingredients were mixed and the pH of the solution adjusted to 8.5 to 9.0 with 10% sodium hydroxide. The mix was heated to reflux and held at this temperature for 30 minutes. The charge was then cooled to 90° C. and the pH adjusted to 3.3 with formic acid. The resin was again maintained at reflux for 45 minutes at which point the pH of the solution was 4.3. Enough formic acid was then added to lower the pH to 3.5 and the resin was cooled to 65° C. and maintained at this temperature until the viscosity of the resin reached D–E (Gardner scale). 100 pounds of water were then added to reduce the resin solids to 40% and the pH was adjusted to 7.0 to 7.5 with 50% sodium hydroxide. The product was then stabilized by the addition of 100 pounds of 37% formaldehyde.

A sheet of regenerated cellulose film was impregnated with an aqueous glycerol solution containing sufficient of the above resin so that 0.3% resin, based on the weight of cellulose, was incorporated into the sheet. The sheet was then dried and coated (at the rate of 3 grams of coating solids per square meter of film) with a compounded nitrocellulose lacquer (moistureproof coating) containing the following ingredients in the parts by weight indicated.

| | Parts |
|---|---|
| Nitrocellulose (11.4% nitrogen) | 43.3 |
| Ester gum | 30.4 |
| Dicyclohexyl phthalate | 29.3 |
| Hydrogenated castor oil phthalate | 10.5 |
| Crystalline paraffin wax—60° C. M. P. | 3.5 |
| Ethyl acetate | 574.0 |
| Ethyl alcohol | 20.0 |
| Toluene | 289.0 |

The adhesion of the coating to the cellulose was good.

Example 2

An enthylenebis(tetrahydro-3,5-dimethylol-s-triazin-4(3H)-one)modified urea-formaldehyde resin was prepared using the following formulation:

| | Parts |
|---|---|
| Urea | 120 |
| 37% formaldehyde | 320 |
| Ethylenebis(tetrahydro - 3,5 - dimethylol - s - triazin-4(3H)-one) solution | 240 |

The above ingredients were mixed and charged to a polymerization kettle. The pH of the solution was 7.94. The solution was heated to boiling under a reflux condenser and then cooled to slightly below its boiling point, following which 4.5 parts of 90% formic acid was added. This reduced the pH of solution to 3.45. The solution was again heated to reflux and held there for about two hours at which time the viscosity of the solution had reached U on the Gardner-Holdt scale. One hundred fifty parts of water was then added, the solution cooled to about 25° C., and the pH of the solution adjusted to 7.2 with 10% sodium hydroxide.

A sheet of regenerated cellulose film was impregnated with an aqueous glycerol solution containing sufficient of the above resin so that 0.175% resin, based on the weight of cellulose, was incorporated into the sheet. The sheet was then dried and coated with the moistureproof coating composition of Example 1. The adhesion of the coating to the cellulose was good.

Example 3

One hundred twenty parts of urea was dissolved in 320 parts of 37% formaldehyde. To this was added 120 parts of tetrahydro-1,3-dimethylol-5-methyl-s-triazin-2(1H)-one solution containing 48 parts of the triazone, and 9 parts of guanidine hydrochloride. The pH of this solution was raised to 7.5 by the addition of 10% sodium hydroxide. This solution was then transferred to a polymerization flask, heated to reflux and held at this temperature for 5 minutes. The pH was then adjusted to approximately 3 by the addition of 90% formic acid and after refluxing for one hour the solution was gradually cooled over a period of three hours to about 50° C. at which time the viscosity of the resin has increased to >T measured by the Gardner bubble-type viscometer. One hundred ten parts of water and 10 parts of 10% sodium hydroxide were added and the resin cooled to 25° C. The product contained 30.2% total solids and had a pH of 7.3.

Example 4

Eighty parts of urea was dissolved in 214 parts of 37% formaldehyde. To this was added 190 parts of a solution of tetrahydro-1,3-dimethylol-5-hydroxyethyl-s-triazin-2(1H)-one. The pH of the resulting solution was adjusted to 8.6 with 10% sodium hydroxide following which the solution was transferred to a polymerization flask, refluxed for 45 minutes and then adjusted to pH 3.4 with 90% formic acid. During the next hour the pH was maintained between 3.6 and 3.8 by the addition of small quantities of 90% formic acid, during which the solution was maintained at reflux. Then the temperature was gradually reduced over a period of 1.5 hr. to 75° C.; at the end of this time the viscosity of the resin had increased to >U, Gardner scale. At this point 130 parts of water and 10 parts of 10% sodium hydroxide was added and the resin was cooled to 25° C. The product contained 28.7% solids and had a final pH of 7.2.

Example 5

One hundred twenty parts of urea was dissolved in 310 parts of 37% formaldehyde. To this was added 120.6 parts of tetrahydro-1,3-dimethylol-5-dimethylaminopropyl-s-triazin-2(1H)-one solution. The solution was adjusted to a pH of 8.7 with 10% sodium hydroxide and transferred to a polymerization flask equipped with reflux condenser, mechanical stirrer, and thermometer. The charge was heated to reflux in 15 minutes and held at this temperature for an additional 5 minutes, after which it was adjusted to pH 4.0 with 90% formic acid. The solution was heated at reflux for an additional 2 hours and at the end of this period the viscosity of the resin had increased to U–V, Gardner scale. One hundred fifty parts of water and 10 parts of 10% sodium hydroxide were then added to the resin solution and it was cooled to 25° C. The product had a final pH of 7.2.

Example 6

One hundred twenty parts of urea was dissolved in 320 parts of 37% formaldehyde. Then 260 parts of a solution of ethylenebis(tetrahydro-3,5-dimethylol-s-triazin-4(3H)-one) was added. This solution was transferred to a polymerization flask equipped with mechanical stirrer, reflux condenser, and thermometer, heated to reflux, and kept at this temperature for 10 minutes. The pH of the solution was then adjusted to 3.6 with 90% formic acid and the solution was then maintained at reflux temperature for 2 hours and 40 minutes. During this time the pH was kept between 3.6 and 5.5 by the addition of small quantities of 90% formic acid. At the end of this time the viscosity of the solution had increased to greater than U on the Gardner scale. The reaction was stopped at this point by adding 150 parts of water plus 5 parts of 10% sodium hydroxide, and the solution was cooled to 25° C. The pH of the product was adjusted to 7.2. Solids content of this solution was 34.4%.

Example 7

One hundred twenty parts of urea was dissolved in 320 parts of 37% formaldehyde. To this was added 140 parts of a solution of ethylenebis(tetrahydro-3,5-dimethylol-s-triazin-4(3H)-one). The mix was transferred to a polymerization flask equipped with mechanical stirrer, reflux condenser, and thermometer. Heat was applied and the solution was heated to reflux. It was maintained at this temperature 10 minutes and the pH then adjusted to 4.2 with 90% formic acid. The solution was refluxed for 3 hours and during this time the pH was maintained between 4.2 and 6.5 by the addition of small quantities of 90% formic acid. At the end of this time the viscosity of the solution had increased to X–Y, Gardner scale. At this point the reaction was stopped by the addition of 200 parts of water and 2 parts of 10% sodium hydroxide. When the resin had been cooled to room temperature, 25° C., the pH was adjusted to 7.2 with 10% sodium hydroxide. The product contained 29.7% solids.

Example 8

Eighty parts of urea was dissolved in 203 parts of 37% formaldehyde. To this was added 162 parts of a solution of ethylenebis(tetrahydro-3,5-dimethylol-s-triazin-4(3H)-one). The pH of this solution was 8.7. It was transferred to a polymerization flask equipped with mechanical stirrer, reflux condenser, and thermometer. The solution was then heated to reflux and held at this temperature 5 minutes, after which the pH was adjusted to 5.4 with 90% formic acid. The solution was maintained at reflux for 1 hour and 45 minutes, during which the pH was maintained between 5.4 and 6.5 by the addition of small quantities of 90% formic acid. At the end of this time the viscosity of the solution had increased to W, Gardner scale. The reaction was stopped by the addition of 160 parts of water and 6 parts of 10% sodium hydroxide. The solution was then cooled to room temperature and the pH of the resin was finally adjusted to 7.2 with 10% sodium hydroxide. The solids content of this resin solution was 32.2%.

Example 9

Eighty parts of urea was dissolved in 224 parts of 37% formaldehyde. To this was added 120 parts of a solution of tetrahydro-1,3-dimethylol-5-hydroxyethyl-s-triazin-2-(1H)-one and 9 parts of guanidine hydrochloride. This solution was transferred to a polymerization flask equipped with mechanical stirrer, reflux condenser, and thermometer. Heat was applied and the mixture was heated to reflux for 30 minutes and then adjusted to pH 2.8–3.0 with formic acid. The solution was kept refluxing for another hour at which time the pH was about 4.5 and the viscosity of the solution was about B, Gardner scale. The pH of the resin was then adjusted to 3.0 with 90% formic acid and cooled to 80° C., where it was held for about 3 hours until the resin viscosity reached U, Gardner scale. Then the reaction was stopped by adding 100 parts of water and 3 parts of 10% sodium hydroxide. The resin was then cooled by means of an ice bath to 25° C. The product had a final pH of 7.2. The solids content of this resin solution was 30%.

Sheets of regenerated cellulose film were impregnated with aqueous glycerol solutions each containing a portion of one of the resins of Examples 3–9. Sufficient resin was used in each case so that 0.175% resin, based on the weight of cellulose, was incorporated into the sheets. The sheets were then dried and coated at the rate of 3 grams of coating solids per square meter of film with the same coating composition utilized in Example 1. In every case, the adhesion of the coating to the cellulose was good.

In carrying out the process of the invention, a nonfibrous regenerated cellulose film is impregnated with an aqueous solution containing a softening agent such as glycerol, ethylene glycol or the like, and sufficient cationic tetrahydro triazone modified urea-formaldehyde resin so that from 0.15% to about 1.0%, based on the cellulose, is incorporated into the film. The film is then dried and coated with a water-repellent composition in a conventional manner.

Impregnation of the film may be carried out in any suitable known manner as by immersing it in an aqueous softening bath containing the resin. Alternatively, if desired, the resin may be applied to the already softened film from a separate aqueous bath.

The resins contemplated for use herein as anchoring agents for bonding the nonfibrous cellulose regenerated film to the water-repellent top coat are hydrophilic cationic modified urea-formaldehyde resins which have been modified by treatment with a mono- or bis-tetrahydro triazone compound selected from the group consisting of compounds of the formula

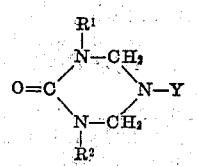

wherein $R^1$ and $R^2$ are hydrogen or hydroxyalkyl and Y is alkyl, hydroxyalkyl, or cycloalkyl, and compounds of the formula X—R—X wherein X is a group of the formula

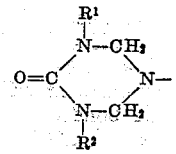

where $R^1$ and $R^2$ are the same as above, and R is selected from a class consisting of an alkylene group containing from 2 to 10 carbon atoms and a group of the formula —$(CH_2CH_2NH)_nCH_2CH_2$— where $n$ is an integer from 1 to 4.

Typical tetrahydro triazone compounds which may be employed as modifiers herein are tetrahydro-5-methyl-s-triazin-2(1H)-one, tetrahydro-5-hydroxyethyl-1,3-dimethylol-s-triazin-2(1H)-one, tetrahydro-5-methyl-1,3-dimethylol-s-triazin-2(1H)-one, tetrahydro-1,3-dimethylol-5-dimethylaminopropyl-s-triazin-2(1H)-one, and ethylenebis-(tetrahydro-3,5-dimethylol-s-triazin-4(3H)-one).

These cationic tetrahydro triazone modified urea-formaldehyde resins may be prepared in a variety of ways. It is preferred to mix all the ingredients i. e. the urea, formaldehyde and tetrahydro triazone compound, together and then heat them, first for a short period of time under alkaline conditions, and then for a relatively long period of time under acid conditions until a resin sirup of relatively low viscosity is formed. If desired, the alkaline reaction may be omitted and the entire reaction carried out under acid conditions. Alternatively, the urea and formaldehyde may be partially polymerized under alkaline conditions folowed by subsequent addition of the modifier coupled with adjustment of the pH to the acid side for a second stage of polymerization.

In any case the polymerization, or at least the last step thereof, is carried out at an acid pH between about pH 2.5 and about pH 6, preferably about pH 4. Various strongly acidic substances may be added to obtain the desired pH such as hydrochloric acid, sulfuric acid, formic acid, etc. Formic acid is preferred.

The preferred temperature for the polymerization under acid conditions is the reflux temperature. However, it can be carried out at any temperature between about 40° C. and about 105° C.

The polymerization is continuel until the viscosity of the resin at 45% solids and 25° C. is greater than about K on the Gardner-Holdt scale. Preferred viscosities, at 45% solids and 25° C., are from about T to about Z on the Gardner-Holdt scale. The upper limit of viscosity is that just short of gelation.

The polymerization is stopped at the desired viscosity by the addition of an alkaline material such as caustic soda until a pH of about 7 is reached. The resulting clear, somewhat viscous liquid is relatively stable and can be stored for substantial lengths of time without a detrimental amount of additional polymerization or other deterioration either with or without added materials such as, for example, stabilizers, additives or the like. The resins so produced are highly water-soluble, are capable of infinite dilution and are thermosetting.

The hereinabove mentioned and other triazone compounds which are employed as modifiers in the preparation of these cationic modified urea-formaldehyde resins may desirably be prepared in accordance with the methods and procedures set forth in U. S. 2,641,584 to Thomas A. Martone, Jr., dated June 9, 1953. As therein disclosed, urea, formaldehyde and a primary amine are reacted together in suitable proportions in mildly alkaline solution. In a representative and preferred preparation, for example, one mole of diethylene triamine, three moles of urea and six moles of formaldehyde are reacted together at a temperature from 80°–85° C. in an aqueous solution adjusted with sodium carbonate to a pH of 8.5–9. This mixture is cooled to 60° C. and four additional moles of formaldehyde are added to form a methylol derivative of the triazone compound.

Triazone compounds suitable for use herein may also be prepared in accordance with the methods and procedures set forth in U. S. Patent 2,304,624 to William James Burke wherein the ingredients are reacted at a temperature of 25 to 100° C. for a period of 1 to 24 hours. Most of the solvent may then be removed by distillation under reduced pressure, the reaction mixture cooled, and the resulting crystalline product removed by filtration.

The triazone compounds may be prepared using primary monoamines and particularly a member of the class of primary monoamines consisting of the lower alkyl monoamines, such as methylamine, ethylamine, propylamine, isopropylamine, n-butylamine and n-hexylamine; the lower hydroxyalkyl monoamines such as ethanolamine and isopropanolamine; and the cycloalkyl monoamines such as cyclopentylamine and cyclohexylamine.

These triazone compounds may also be prepared using as the primary amine a linear polyamine containing from 2 to 8 carbon atoms, 2 primary amino groups, and from 0 to 3 secondary amino groups, the nitrogen atoms in the polyamine being separated by at least 2 carbon atoms from one another.

In preparing the triazone compounds, the urea and formaldehyde may first be heated together and the primary amine be added thereafter or all three ingredients may be added simultaneously. Furthermore, in the case of the methylolated compounds, instead of adding the extra quantity of formaldehyde needed to form the methylol groups after the formation of the triazone rings, the entire amount of formaldehyde may be added originally.

The tetrahydro triazone compounds, prepared as briefly described above, and as more fully described in the aforementioned patents, may be utilized as modifiers for urea-formaldehyde resins without separation from the crude reaction mixtures in which formed or alternately may be recovered and purified in any suitable manner. The amount of the modifying compound employed may vary from about 10% to about 100% by weight of the urea. The formaldehyde is usually employed in an amount from about 1.8 moles to about 2.4 moles per mole of urea although this range is not to be considered as critical but merely expressive of optimum conditions.

In the employment of the monocyclic tetrahydro triazone compounds as modifiers, optimum results are obtained by the inclusion of guanidine hydrochloride in an amount from about 0.02 to about 0.1 mole per mole of urea. Therefore, in the use of these compounds as modifiers it is preferred to include guanidine hydrochloride in the amounts specified.

While the urea in the cationic tetrahydro triazone modified urea-formaldehyde resin is a preferred material it may be replaced by closely related materials, such as thiourea or the like, and may be replaced in part by numerous materials such as melamine, thiourea, guanidine, aminoguanidine, diamines, and the like. As a matter of fact, as hereinabove pointed out, the replacement of part of the urea with guanidine is a preferred procedure when utilizing a monocyclic triazone modifier. By the same token, the formaldehyde may be wholly or partially replaced by formaldehyde-generating materials, such as paraformaldehyde and the like, and may be replaced in part by closely related materials such as acetaldehyde, glyoxal, and the like.

Any of the well-known water-repellent coating compositions or lacquers which are applied to regenerated cellulose films may be utilized herein. Customarily such lacquers comprise a film-former such as cellulose nitrate, ethyl celluose, chlorinated rubber, etc., a plasticizer for the film-former, a moistureproofing agent such as paraffin wax, a blending agent, volatile solvents, etc. Examples of typical moistureproofing compositions may be found in U. S. 1,737,187 (Charch and Prindle), U. S. 1,997,583 (Hitt), U. S. 2,079,379 (Mitchell), U. S. 2,079,395 (Bradshaw), U. S. 2,147,180 (Ubben), U. S. 2,236,546 (Mitchell), etc.

In addition to the usual ingredients indicated above the water-repellent coating composition or lacquer will also desirably include an acid polymerization catalyst in an amount varying from about 0.1 to about 10.0%, based on the solids in the lacquer. Any of the acid polymerization catalysts which are useful for this purpose may be utilized. Exemplary compounds of this type are maleic acid, itaconic acid, fumaric acid, paratoluene sulfonic acid, phosphoric acid, acetic acid, hydroxy acetic acid, oxalic acid, policyclic acid, ethyl acid phosphate, and so on. Maleic acid is preferred.

What I claim and desire to protect by Letters Patent is:

1. A process of treating nonfibrous regenerated cellulose film which comprises impregnating said film with an aqueous solution of a hydrophilic cationic tetrahydro triazone modified urea-formaldehyde resin, said resin being a reaction product of urea, from about 1.8 to about 2.4 moles of formaldehyde per mole of urea and from about 10% to about 100% by weight, based on the weight of urea, of a tetrahydrotriazone, drying the film, and applying thereto a water-repellent coating.

2. A process in accordance with claim 1 wherein the tetrahydro triazone modifier for the modified urea-formaldehyde resin is selected from the class consisting of compounds of the formula

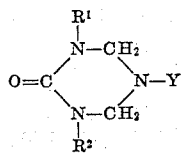

wherein $R^1$ and $R^2$ are selected from the group consisting of hydrogen and hydroxyalkyl and Y is selected from the group consisting of hydroxyalkyl and cycloalkyl, and compounds of the formula X—R—X wherein X is a group of the formula

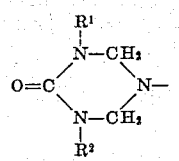

where $R^1$ and $R^2$ are the same as above, and R is selected from a class consisting of an alkylene group containing from 2 to 10 carbon atoms and a group of the formula —$(CH_2CH_2NH)_nCH_2CH_2$— where $n$ is an integer from 1 to 4.

3. A process in accordance with claim 2 in which the amount of cationic tetrahydro triazone modified urea-formaldehyde resin incorporated with the film is from about 0.15% to about 1.0%, based on the cellulose.

4. A process in accordance with claim 3 in which the tetrahydro triazone modifier is a tetrahydro-3,5-dimethylol-5-alkyl-s-triazin-2(1H)-one.

5. A process in accordance with claim 3 in which the tetrahydro triazone modifier is ethylenebis(tetrahydro-3,5-dimethylol-s-triazin-4(3H)-one).

6. A nonfibrous regenerated cellulose film having a water-repellent coating bonded thereto by a tetrahydro triazone modified urea-formaldehyde resin, the tetrahydro triazone modifier for the urea-formaldehyde resin being a compound selected from the class consisting of compounds of the formula

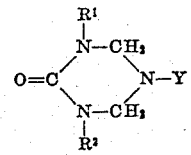

wherein $R^1$ and $R^2$ are selected from the group consisting of hydrogen and hydroxyalkyl and Y is selected from the group consisting of hydroxyalkyl and cycloalkyl, and compounds of the formula X—R—X wherein X is a group of the formula

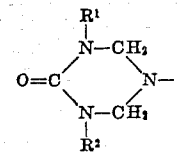

where $R^1$ and $R^2$ are the same as above, and R is selected from a class consisting of an alkylene group containing from 2 to 10 carbon atoms and a group of the formula —$(CH_2CH_2NH)_nCH_2CH_2$— where $n$ is an integer from 1 to 4.

References Cited in the file of this patent

UNITED STATES PATENTS

| | | |
|---|---|---|
| 2,304,624 | Burke | Dec. 8, 1942 |
| 2,321,989 | Burke | June 15, 1943 |
| 2,373,135 | Maxwell | Apr. 10, 1945 |
| 2,430,708 | D'Alelio | Nov. 11, 1947 |
| 2,641,584 | Martone | June 9, 1953 |
| 2,690,404 | Spangler | Sept. 28, 1954 |
| 2,728,688 | Wellisch | Dec. 27, 1955 |
| 2,764,507 | Jen et al. | Sept. 25, 1956 |
| 2,804,402 | Williams | Aug. 27, 1957 |